Patented June 15, 1943

2,322,015

UNITED STATES PATENT OFFICE 2,322,015

DYE AND PHOTOGRAPHIC EMULSION CONTAINING THE SAME

Frances Mary Hamer and Russell James Rathbone, Wealdstone, Harrow, England, assignors to Eastman Kodak Company, Rochester, N. Y., a corporation of New Jersey No Drawing. Application May 22, 1940, Serial No. 336,584
In Great Britain May 25, 1939

11 Claims. (Cl. 260—240)

This invention relates to new dyes and intermediates therefor and to photographic emulsions containing such dyes.

Certain dyes of the merocyanine class are known to alter the sensitivity of photographic emulsions. Various dyes of this class have been described but it has not hitherto been proposed to make merocyanine dyes containing a simple 1:3-thiazine nucleus. We have now found that these dyes can be obtained by condensing a 1:3-thiazine compound having a reactive substituent in the 2-position to the cyclic nitrogen atom with a compound containing a reactive methylene group adjacent to a carbonyl or thio-carbonyl group.

It is accordingly an object of our invention to provide new dyes. A further object is to provide a process for preparing such new dyes. A further object is to provide photographic emulsions sensitized with our new dyes. A still further object is to provide new intermediates for the preparation of our new dyes. Yet another object is to provide light filters containing our new dyes. Other objects will appear hereinafter.

The dyes of our invention can, for convenience, be illustrated by the following general formula:

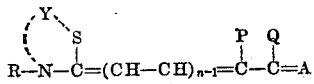

wherein Y represents the non-metallic atoms necessary to complete a 1:3-thiazine nucleus, A represents a divalent non-metallic atom of the oxygen group of elements, such as oxygen or sulphur, $n$ represents a positive integer, P and Q each represent an organic group and P and Q together represent the non-metallic atoms necessary to complete a cyclic organic nucleus, and R represents an alkyl group.

More particularly, P and Q together may represent the atoms to complete a five-membered or six-membered heterocyclic nucleus, such as a nucleus containing sulphur and nitrogen, e. g. a rhodanine nucleus, especially a 3-substituted rhodanine nucleus, or a thiohydantoin nucleus or a barbituric acid nucleus or an oxazoledione nucleus; alternatively, P may represent cyanogen or quinolyl or CO.R, where R is an alkyl or aryl group, whilst Q may represent acyl or aryl or alkylamino or arylamino or alkoxyl or carboxyl or carbalkoxy.

The dyes may carry simple substituents in the nuclei or in the methenyl chain.

In accordance with our invention we prepare our new dyes from 1:3-thiazine compounds having a reactive substituent in the 2 position to the cyclic nitrogen atom. We have found that in a particularly advantageous method of preparing certain of our new dyes, there may be used 1:3-thiazine compounds having a thio or mercapto group in the 2 position, and these compounds are our novel intermediates. More particularly the substituent in the 2 position may be alkylthiol, such as methylthiol or ethylthiol; arylthiol, such as phenylthiol; or aralkylthiol. However, the methods of preparing our new dyes are not limited to those aforesaid since 1:3-thiazine compounds having other substituents in the 2 position may be used. For example, compounds in which the substituent is alkyl, such as methyl or ethyl; aralkyl, such as ω-acetanilidovinyl or ω-anilino-Δ-1:3-butadienyl; amino, or the like.

All the above-mentioned intermediates are preferably used in the form of their quaternary salts. We have found that quaternary salts containing a simple nuclear substituent such as chloro, amino or alkoxy, for example, can be employed as well as the unsubstituted quaternary salts. We have found it advantageous to employ the alkhalides, particularly the alkiodides, although other quaternary salts can be employed, for example, the alkyl sulfates, the alkyl-p-tonuenesulfonates, the alkoxyalkyl halides, the aralkyl halides, or the like.

Such quaternary salts may be condensed with a compound, which may or may not be cyclic, containing a reactive methylene group adjacent to a carbonyl group or a thiocarbonyl group. More particularly such compounds may be, for example, rhodanines, especially 3-substituted rhodanines such as 3-ethyl rhodanine, thiohydantoins, such as 1-phenyl-3-ethyl-thiohydantoins, barbituric acids, thiobarbituric acids, 2-thio-2:4-oxazolediones, aroylacetonitriles, cyanoacetamides, such as cyano-acetanilide, benzoylacetones, acetylacetone, and the like.

In a preferred method of preparing certain of our new dyes a compound such as a 2-alkyl-thiol-1:3-thiazine quaternary salt is condensed with a compound such as rhodanine in the presence of a strong organic base such as triethylamine and a suitable solvent such as ethanol.

Other members of our new class of dyes may be prepared by methods analogous to those disclosed in British Patent Specifications 450,958, 466,097, 470,726, 479,970 and 493,455.

The preparation of our novel intermediates may be illustrated by the following examples which are not intended to limit our invention.

EXAMPLE 1.—*2-methylthioldihydro-1:3-thiazine*

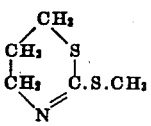

2-thioldihydro-1:3-thiazine (8 g. 1 mol.) was treated with sufficient aqueous sodium hydroxide solution (20%) to dissolve it and then methyl sulphate (1.9 c. c.; 2 mols.) was gradually added, the reaction mixture being kept alkaline by addition of sodium hydroxide solution from time to time. The oil which separated was extracted with ether and the extract was dried with anhydrous sodium sulphate. The base was obtained as a colourless oil, B. P. 155–160° C./50 m. m.

2-thioldihydro-1:3-thiazine was prepared by converting 3-bromopropylphthalimide into 3-bromopropylamine hydrobromide (see Gabriel & Weiner, Ber. 1888, 21, 2669) and then treating this with aqueous sodium hydroxide and carbon disulphide.

*2-ethylthioldihydro-1:3-thiazine*

Reaction between 2-thioldihydro-1:3-thiazine, sodium hydroxide solution and ethyl sulphate was brought about in a manner similar to that above, but completed by heating on the water-bath for half an hour, with occasional shaking. The twice distilled base was obtained as a colourless oil, B. P. 145–150°/40 m. m.

EXAMPLE 2.—*2-methylthioldihydro-1:3-thiazine methiodide*

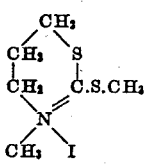

2-methylthioldihydro-1:3-thiazine (5.3 g.; 1 mol.) and methyl iodide (5 c. c.; 2 mols.) were sealed up together in a tube and kept at room temperature for 40 hours. The methiodide which separated was filtered off and washed with ether. After recrystallization from ethyl alcohol, it was obtained as pale yellow crystals, M. P. 125°.

2-ethylthioldihydro-1:3-thiazine ethiodide was prepared by leaving 2-ethylthioldihydro-1:3-thiazine and ethyl iodide in contact in a sealed tube at room temperature for 40 hours and then heating in a boiling water-bath for 8 hours. The ethiodide was ground with ethyl acetate and dried in a vacuum desiccator, being obtained as a buff powder, M. P. 80–83° C.

2-ethylthioldihydro-1:3-thiazine methiodide resulted by interaction of 2-methylthioldihydro-1:3-thiazine and ethyl iodide, whereas it might have been expected that 2-methyl-thioldihydro-1:3-thiazine ethiodide would be obtained.

EXAMPLE 3.—*2-methyldihydro-1:3-thiazine methiodide*

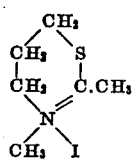

2-methyldihydro-1:3-thiazine (1.8 g.; 1 mol.) was dried by heating in a vacuum on a water-bath. It was corked up with excess of methyl iodide (2.5 c. c.; 2 mols.) and, after some hours, the methiodide separated, sometimes as a cream coloured solid, and sometimes as an oil. It was purified by washing with absolute ether. As it was very hygroscopic, it was kept in a vacuum desiccator before use.

EXAMPLE 4.—*2-thio-3-methyltetrahydro-1:3-thiazine*

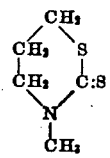

2-methylthioldihydro-1:3-thiazine methiodide (see Example 2) (5.9 g.) was boiled under reflux with pyridine (20 c. c.) for 20 minutes. The reaction mixture was poured into 100 c. c. water and the solution concentrated on a steam bath, under reduced pressure, to 30 c. c. and cooled. The crude product obtained was recrystallized from 15 c. c. ethyl alcohol (yield 1.9 g.; 62%). M. P. 88° C.

EXAMPLE 5.—*2-thio-3-methyltetrahydro-1:3-thiazine methiodide*

2-thio-3-methyltetrahydro-1:3-thiazine (1 g.:1 mol.) and methyl iodide (0.65 c. c.; 1.5 mols.) were sealed in a tube and allowed to stand at room temperature for a few hours. The methiodide which was formed was then ground with ether and obtained as a pure white, deliquescent solid. M. P. 60° C. (yield; 2.05 g.; 99%).

While the process of preparing our new dyes is subject to variation, particularly with respect to the nature and quantity of the quaternary salts employed, the nature and quantity of the compound containing a reactive methylene group employed, the nature and quantity of the basic condensing agent employed, the nature and quantity of the diluent employed, the order of procedure and method of isolation of the dye and the temperature employed, the following examples will serve to illustrate the mode of practising the process of our invention. These examples are not intended to limit our invention.

EXAMPLE 6.—*3-ethyl-5:2'-(3'-ethyldihydro-1':3'-thiazinylidene) rhodanine*

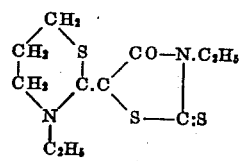

2-ethylthioldihydro-1:3-thiazine ethiodide (1.59 g.; 1 mol.), 3-ethylrhodanine (0.81 g.; 1 mol.) triethylamine (2 c. c.:1.5 mols.), and ethyl alcohol (7 c. c.) were heated together on the water-bath, with stirring, for 3 minutes. The resultant solid was washed with water and recrystallized, first from ethyl alcohol, and then from petrol ether, B. P. 80–100°. The bright yellow crystals, M. P. 102°, gave a yellow spirit solution. The dye sensitized an unwashed gelatino silver chloride emulsion, the sensitizing maximum being at 440 mμ and the sensitivity extending to 480 mμ with no fog or stain.

Example 7.—*3 - ethyl - 5:2'(3' - methyldihydro-1':3'-thiazinylidene-vinyl)-rhodanine*

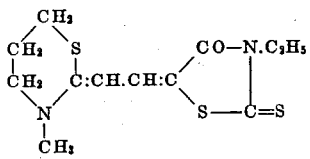

2 - ω - acetanilidovinyldihydro - 1 : 3 - thiazine methiodide (1.52 g.; 1 mol.), 3-ethylrhodanine (0.81 g.; 1 mol.) triethylamine (0.7 c. c.; 1.1 mols.) and absolute alcohol (15 c. c.) were boiled and stirred together for 4 minutes. The product was washed with water and recrystallized from pyridine. The dull red solid, M. P. 195° C. (decomp.), gave a yellow spirit solution. The dye gave a sensitizing maximum at 545 mμ and its action extended to 580 mμ, the ratio of green to blue sensitivity being good. 2-ω-acetanilidovinyldihydro-1:3-thiazine methiodide can be prepared according to the general method for preparing acetanilidovinyl cyclammonium quaternary salts set forth in British Patent 344,409, accepted March 4, 1931, viz. by condensing the cyclammonium quaternary salt containing a methyl group (in this case 2-methyl-1:3-thiazine methiodide) with diphenylformamidine, in the presence of acetic anhydride.

Our new dyes are especially useful for sensitizing photographic silver halide emulsions. In the preparation of photographic emulsions containing our new dyes, it is only necessary to disperse the dyes in the emulsions. The methods of incorporating dyes in emulsions are simple and well known to those skilled in the art. In practice, it is convenient to add the dyes to the emulsions in the form of a solution in an appropriate solvent. Methanol has proved satisfactory as a solvent for our new dyes. The dyes are advantageously incorporated in the washed, finished emulsions.

The concentration of our new dyes in the emulsion can vary widely, e. g. from 5 to about 100 mg. per liter of flowable emulsion. The concentration of the dye will vary according to the type of emulsion and according to the effects desired. The suitable and most economical concentration for any given emulsion will be apparent to those skilled in the art, upon making the ordinary tests and observations customarily used in the art of emulsion-making. To prepare a gelatino-silver-halide emulsion, the following procedure is satisfactory: A quantity of the dye is dissolved in methyl alcohol or acetone and a volume of this solution (which may be diluted with water) containing from 5 to 100 mg. of dye, is slowly added to about 1000 c. c. of a gelatino-silver-halide emulsion, with stirring. Stirring is continued until the dye is thoroughly incorporated.

With most of our new dyes, about 40 mg. of dye per liter of gelatino-silver halide emulsion suffice to produce the maximum sensitizing effect.

The above statements are only illustrative, as it will be apparent that our dyes can be incorporated in photographic emulsions by any of the other methods customarily employed in the art; as by bathing a plate or film upon which an emulsion is coated, in a solution of the dye in an appropriate solvent, although such a method is not ordinarily to be preferred.

Emulsions sensitized with our new dyes can be coated on to suitable supports, such as glass cellulose derivative film, resin film or paper, in the usual manner.

Our new dyes also give rise to valuable light filters when incorporated in a suitable medium. The medium may be a layer of a colloid such as gelatine or a cellulose derivative or a transparent resin or the like and such layer may be coated on glass or other rigid support. We have found that when incorporated in a colloid medium for the purpose of preparing light filters our new dyes may be used in quantities of about 0.1 gm. to 1 gm. per liter of colloid. If desired, filter layers containing our new dyes may be incorporated in multi-layer photographic elements.

What we claim as our invention and desire to be secured by Letters Patent of the United States is:

1. A merocyanine dye of the following formula:

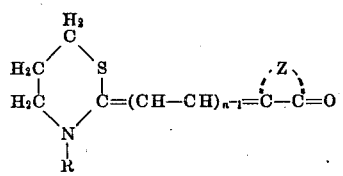

wherein $n$ represents a positive integer not greater than two, R represents an alkyl group and Z represents the non-metallic atoms necessary to complete a heterocyclic nucleus selected from the group consisting of five-membered and six-membered heterocyclic nuclei.

2. A merocyanine dye of the following formula:

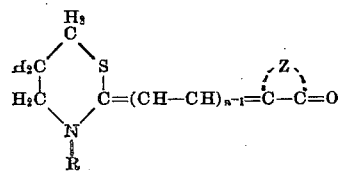

wherein $n$ represents a positive integer not greater than two, R represents an alkyl group and Z represents the non-metallic atoms necessary to complete a five-membered heterocyclic nucleus containing a nuclear sulfur atom and a nuclear nitrogen atom.

3. A merocyanine dye of the following formula:

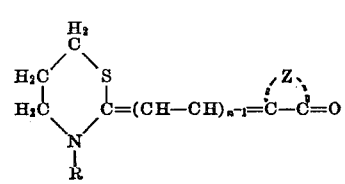

wherein $n$ represents a positive integer not greater than two, R represents an alkyl group and Z represents the non-metallic atoms necessary to complete a rhodanine nucleus.

4. A dye of the following formula:

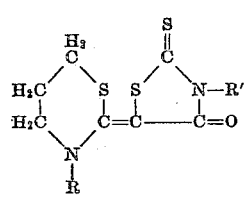

wherein R and R' represent alkyl groups.

5. A dye of the following formula:

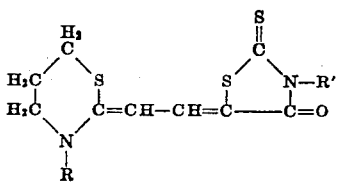

wherein R and R' represent alkyl groups.

6. A dye of the following formula:

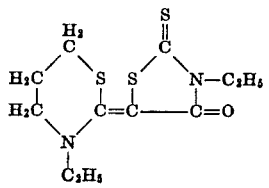

7. A dye of the following formula:

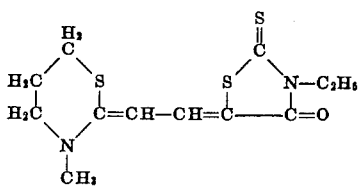

8. A process for preparing a dye comprising reacting a quaternary salt of a hihydro 1:3-thiazine containing, in the 2-position, a member selected from the group consisting of alkylthiol groups and ω-acylated phenylamino groups, with a heterocyclic compound selected from the group consisting of five-membered heterocyclic compounds containing a nuclear ketomethylene group and six-membered heterocyclic compounds containing a nuclear ketomethylene group, in the presence of an acid-binding agent.

9. A process for preparing a dye comprising reacting a quaternary salt of a dihydro-1:3-thiazine containing, in the 2-position, a member selected from the group consisting of alkylthiol groups and ω-acylatedphenylamino groups, with a rhodanine compound, in the presence of an acid-binding agent.

10. A process for preparing a dye comprising reacting a quaternary salt of a dihydro-1:3-thiazine containing, in the 2-position, an alkylthiol group, with a rhodanine compound, in the presence of an acid-binding agent.

11. A process for preparing a dye comprising reacting a quaternary salt of a dihydro-1:3-thiazine containing, in the 2-position, an ω-acetanilidovinyl group, with a rhodanine compound, in the presence of an acid-binding agent.

FRANCES MARY HAMER.
RUSSELL JAMES RATHBONE.